US012633309B2

(12) United States Patent　　(10) Patent No.:　US 12,633,309 B2
Lamberts et al.　　(45) Date of Patent:　May 19, 2026

(54) DATA STORAGE DEVICE WITH INTELLIGENT WRITE PROTECTION FOR ENERGY ANOMALIES IN ENERGY-ASSISTED MAGNETIC RECORDING

(71) Applicant: WESTERN DIGITAL TECHNOLOGIES, INC., San Jose, CA (US)

(72) Inventors: Bernd Lamberts, San Jose, CA (US); William B. Boyle, Lake Forest, CA (US); David R. Hall, Rochester, MN (US); Erhard Schreck, San Jose, CA (US); Qing Dai, San Jose, CA (US); Phillip S. Haralson, Huntington Beach, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 145 days.

(21) Appl. No.: 18/231,905

(22) Filed: Aug. 9, 2023

(65) Prior Publication Data

US 2024/0331729 A1　　Oct. 3, 2024

Related U.S. Application Data

(60) Provisional application No. 63/455,894, filed on Mar. 30, 2023.

(51) Int. Cl.
*G11B 7/0045*　　(2006.01)
*G11B 19/04*　　(2006.01)
(52) U.S. Cl.
CPC ........ *G11B 7/00458* (2013.01); *G11B 19/044* (2013.01)

(58) Field of Classification Search
None
See application file for complete search history.

(56) References Cited

U.S. PATENT DOCUMENTS 7,006,336 B2 *　2/2006　Coffey ................. G11B 5/3967
7,382,562 B2 *　6/2008　Emo ......................... G11B 5/40
(Continued)

OTHER PUBLICATIONS

Notice of Allowance dated May 23, 2024 in related U.S. Appl. No. 18/232,009, 6 pages.

(Continued)

*Primary Examiner* — Fred Tzeng
(74) *Attorney, Agent, or Firm* — Calderon Safran & Wright P.C.

(57)　　　　ABSTRACT

Various illustrative aspects are directed to a data storage device, comprising one or more disks; an actuator system configured to position a selected head among one or more heads proximate to a corresponding disk surface among the one or more disks; and one or more processing devices. The selected head comprises a write element, an assistive energy emitter, an energizing interface coupled to the assistive energy emitter, and a detector. The assistive energy emitter is driven separately from driving of the write element. The one or more processing devices are configured to detect, via the detector, an energy anomaly at the energizing interface; detect, in response to detecting the energy anomaly, whether a previously written track yields an anomalous readback signal; and rewrite, in response to detecting that the previously written track yields an anomalous readback signal, data designated for the previously written track to the previously written track.

20 Claims, 6 Drawing Sheets

(56) References Cited

U.S. PATENT DOCUMENTS

| | | | | |
|---|---|---|---|---|
| 8,289,821 B1 * | 10/2012 | Huber | G11B 20/10222 | |
| | | | 369/30.03 | |
| 8,406,090 B2 * | 3/2013 | Juang | G11B 5/607 | |
| | | | 369/13.03 | |
| 8,477,569 B2 * | 7/2013 | Erden | G11B 5/012 | |
| | | | 369/13.01 | |
| 8,810,953 B2 * | 8/2014 | Okada | G11B 5/607 | |
| | | | 360/75 | |
| 8,824,085 B2 * | 9/2014 | Wilson | G11B 5/314 | |
| | | | 360/59 | |
| 8,854,930 B1 * | 10/2014 | Clinton | G11B 5/02 | |
| | | | 360/59 | |
| 8,897,103 B2 * | 11/2014 | Alex | G11B 5/455 | |
| | | | 369/13.26 | |
| 9,318,153 B2 | 4/2016 | Trantham et al. | | |
| 9,548,068 B1 * | 1/2017 | Rausch | G11B 5/59627 | |
| 9,583,135 B1 | 2/2017 | Ma et al. | | |
| 9,595,288 B1 | 3/2017 | Chu et al. | | |
| 9,747,928 B1 | 8/2017 | Ruan et al. | | |
| 9,916,849 B1 * | 3/2018 | Mader | G11B 7/126 | |
| 10,008,231 B2 | 6/2018 | Granz et al. | | |
| 10,366,711 B1 * | 7/2019 | Liu | G11B 9/1409 | |
| 10,366,722 B1 | 7/2019 | Mendonsa | | |
| 10,720,177 B1 | 7/2020 | Ng et al. | | |
| 11,361,787 B1 * | 6/2022 | Mendonsa | G11B 5/4813 | |
| 11,587,586 B1 * | 2/2023 | Yasuna | G11B 13/04 | |
| 11,587,587 B1 * | 2/2023 | Yasuna | G11B 5/607 | |
| 11,600,296 B1 * | 3/2023 | Gao | G11B 20/1217 | |
| 12,100,432 B1 * | 9/2024 | Sakoguchi | G11B 5/6029 | |
| 12,230,304 B2 * | 2/2025 | Lamberts | G11B 5/607 | |
| 2004/0027728 A1 * | 2/2004 | Coffey | G11B 5/127 | |
| 2008/0112076 A1 * | 5/2008 | Biskeborn | G11B 20/10481 | |
| | | | 360/122 | |
| 2012/0008470 A1 * | 1/2012 | Shimazawa | G11B 5/314 | |
| 2014/0119164 A1 * | 5/2014 | Wilson | G11B 5/6088 | |
| | | | 369/13.32 | |
| 2015/0279430 A1 * | 10/2015 | Trantham | G11B 5/6088 | |
| | | | 369/13.26 | |
| 2016/0087401 A1 | 3/2016 | Wessel et al. | | |
| 2016/0121416 A1 * | 5/2016 | Murata | B23K 1/0016 | |
| | | | 228/248.1 | |
| 2020/0118590 A1 | 4/2020 | Tatah et al. | | |
| 2024/0221779 A1 * | 7/2024 | Guo | G11B 5/596 | |
| 2024/0221784 A1 * | 7/2024 | Guo | G11B 5/59655 | |
| 2024/0304212 A1 * | 9/2024 | Gao | G11B 5/02 | |

OTHER PUBLICATIONS

T. Rausch et al., HAMR Drive Performance and Integration Challenges https://www.researchgate.net/publication/260500905_HAMR_Drive_Performance_and_Integration_Challenges IEEE Transactions on Magnetics, vol. 49, No. 2, Feb. 2013 4 pages.

* cited by examiner

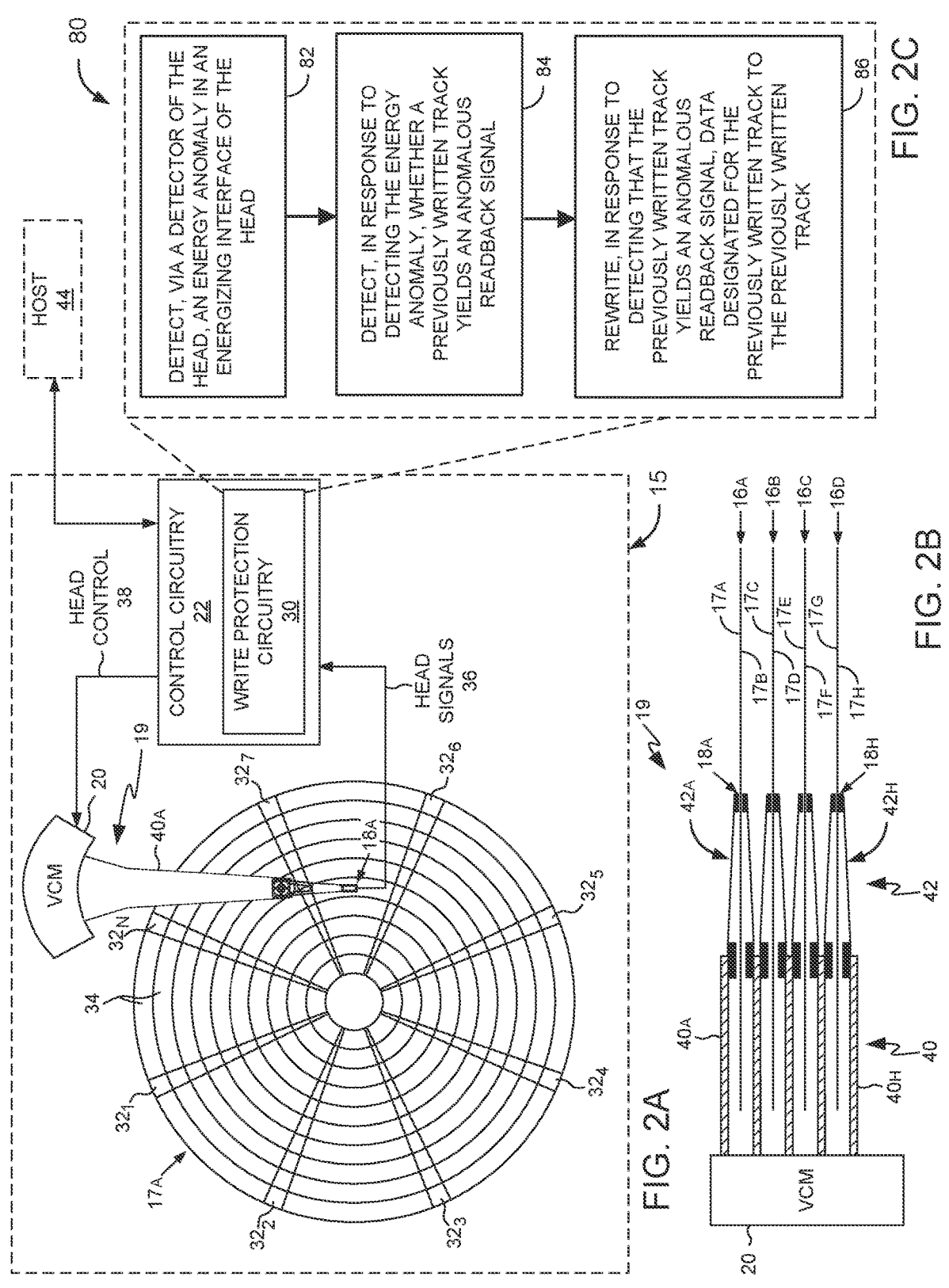

DETECT, VIA A DETECTOR OF THE HEAD, AN ENERGY ANOMALY IN AN ENERGIZING INTERFACE OF THE HEAD
82

DETECT, IN RESPONSE TO DETECTING THE ENERGY ANOMALY, WHETHER A PREVIOUSLY WRITTEN TRACK YIELDS AN ANOMALOUS READBACK SIGNAL
84

REWRITE, IN RESPONSE TO DETECTING THAT THE PREVIOUSLY WRITTEN TRACK YIELDS AN ANOMALOUS READBACK SIGNAL, DATA DESIGNATED FOR THE PREVIOUSLY WRITTEN TRACK TO THE PREVIOUSLY WRITTEN TRACK
86

FIG. 2C

HOST
44

CONTROL CIRCUITRY
22

WRITE PROTECTION CIRCUITRY
30

HEAD CONTROL
38

HEAD SIGNALS
36

VCM

VCM

DATA STORAGE DEVICE WITH INTELLIGENT WRITE PROTECTION FOR ENERGY ANOMALIES IN ENERGY-ASSISTED MAGNETIC RECORDING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge 6₁ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 6₄) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry that includes novel and inventive capability to detect and protect against energy anomalies in real-time in energy-assisted magnetic recording, in accordance with aspects of the present disclosure. As illustrative examples, control circuitry of this disclosure may detect and protect against anomalous laser energy due to laser mode hops, chemical accumulation or corrosion or mechanical damage to laser emission interface components, or laser diode failure, in heat-assisted magnetic recording (HAMR). As further illustrative examples, control circuitry of this disclosure may detect and protect against anomalous microwave energy due to chemical accumulation or corrosion or mechanical damage to a microwave waveguide or other microwave emission interface components, or failure of a magnetron or other microwave emitter components, in microwave-assisted magnetic recording (MAMR). Various aspects of this disclosure address and resolve novel aspects of generalized write operation energy anomalies associated with data recording subsystems using energy-assisted recording.

In various aspects of this disclosure, data storage device control circuitry may perform real-time, fine-grained, direct monitoring of energy-assisted write system conditions, e.g., on time scales of microseconds, or other rapid time scales on par with the time scales of performing write operations, in various examples. The data storage device control circuitry may further use the write system energy monitoring to detect any write system energy anomalies in real-time. For example, the data storage device control circuitry may detect a write system energy anomaly in the form of an anomalous and unintended change in write-assist laser power in a HAMR example. The control circuitry may detect if the most recently written data do not yield nominal readback signals or do not yield any readback signals, indicative of a partial or total anomaly, respectively, of the write operation induced by the energy anomaly.

Data storage device control circuitry of this disclosure may then perform rapid remediation of any detected write system energy anomalies. For example, control circuitry of this disclosure may, in response to detecting an energy anomaly, rapidly perform a backward scan of the most recently written one or more tracks or portions of tracks of data to assess whether the recently written data yields nominal readback signals, or whether the recent write operations were impacted by the energy anomaly and were not performed nominally and do not yield nominal readback signals. In response to detecting anomalous readback signals of the data recently written or intended to have been written, control circuitry of this disclosure may perform a write protection process of this disclosure. For example, control circuitry of this disclosure may confirm that the energy interface is again at nominal energy and then perform a new, replacement write operation of the same data, to the same sectors, track portions, or tracks, in some examples. In further examples, in response to detecting repeated or ongoing anomaly in the energy interface, control circuitry may re-direct the data initially intended and designated to be written using the energy interface impacted by anomalous energy and record those data elsewhere, such as in a media cache, or any other advantageous memory or data storage location, in various examples.

Remarkably, control circuitry of this disclosure may perform data write protection processes such as these with no impact to data throughput and write performance, in various examples of this disclosure. Control circuitry may be configured to perform data write staging and asynchronous write operations, with substantial throughput and timing margins, in various examples of this disclosure. Control circuitry may maintain data to be written in one or more staging buffers, and may use the same data from the staging buffer again to rewrite the data to the same one or more sectors or tracks, in various examples. Control circuitry may be configured with a large enough buffer to rewrite, from the buffer, all write data that are statistically likely or possible to be written anomalously due to an energy anomaly, before being enabled to detect and remediate the energy anomaly, in some examples of this disclosure. Control circuitry may also be configured to recreate and/or rewrite the anomaly-impacted data from one or more buffers, one or more sources of error correction code (ECC) information, and/or one or more other resources, in various examples. Control circuitry of this disclosure may perform data write protection processes with negligible or very little impact to data throughput and write performance, in other examples of this disclosure.

Control circuitry may thereby protect write operations with high performance in energy-assisted magnetic recording, and enable energy-assisted magnetic recording data storage that is reliable and high performance in ways beyond what is possible in conventional energy-assisted recording, in various examples of this disclosure. Further aspects of write protection and various advantages of this disclosure are further described below.

Various illustrative aspects are directed to a data storage device, comprising one or more disks; an actuator system configured to position a selected head among one or more heads proximate to a corresponding disk surface among the one or more disks; and one or more processing devices. The selected head comprises a write element, an assistive energy emitter, an energizing interface coupled to the assistive energy emitter, and a detector. The assistive energy emitter is driven separately from driving of the write element. The one or more processing devices are configured to detect, via the detector, an energy anomaly at the energizing interface; detect, in response to detecting the energy anomaly, whether a previously written track yields an anomalous readback signal; and rewrite, in response to detecting that the previously written track yields an anomalous readback signal, data designated for the previously written track to the previously written track.

Various illustrative aspects are directed to a method comprising detecting, by one or more processing devices, via a detector of a selected head of one or more heads of a data storage device comprising one or more disks and an actuator system configured to position the selected head proximate to a corresponding disk surface among the one or more disks, an energy anomaly at an energizing interface of the selected head, wherein the selected head comprises a write element, an assistive energy emitter, the energizing interface, and a detector, wherein the energizing interface is coupled to the assistive energy emitter, and wherein the assistive energy emitter is driven separately from driving of the write element. The method further comprises detecting, in response to detecting the energy anomaly, whether a previously written track yields an anomalous readback signal. The method further comprises rewriting, in response to detecting that the previously written track yields an anomalous readback signal, data designated for the previously written track to the previously written track.

Various illustrative aspects are directed to one or more processing devices comprising means for detecting, via a detector of a selected head of one or more heads of a data storage device comprising one or more disks and an actuator system configured to position the selected head proximate to a corresponding disk surface among the one or more disks, an energy anomaly at an energizing interface of an energy-assisted write system of the selected head, wherein the selected head comprises a write element, an assistive energy emitter, the energizing interface, and a detector, wherein the energizing interface is coupled to the assistive energy emitter, and wherein the assistive energy emitter is driven separately from driving of the write element. The one or more processing devices further comprise means for detecting, in response to detecting the energy anomaly, whether a previously written track yields an anomalous readback signal. The one or more processing devices further comprise means for rewriting, in response to detecting that the previously written track yields an anomalous readback signal, data designated for the previously written track to the previously written track Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view, respectively, of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, including for energy anomaly detection and intelligent write protection, in accordance with aspects of the present disclosure.

DETAILED DESCRIPTION

Figure 1:
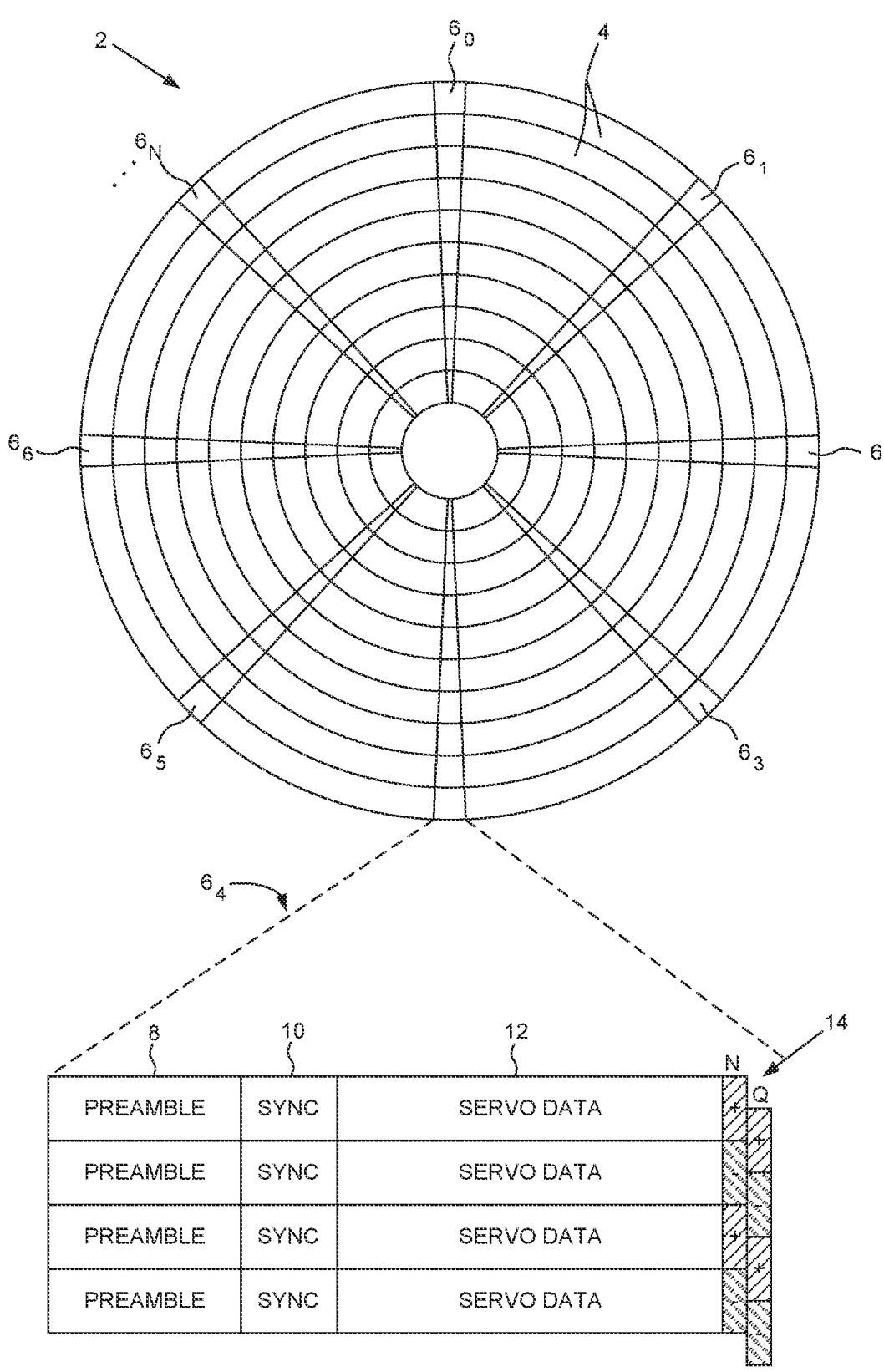
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises write protection circuitry 30. FIG. 2C depicts a flowchart for an example method 80 that write protection circuitry 30 of control circuitry 22 may perform or execute in controlling the operations of disk drive 15, including operations involved in energy anomaly detection and intelligent write protection, in accordance with aspects of the present disclosure. All examples and descriptions presented herein are of illustrative and non-exclusive examples of the present disclosure, and in all cases, other examples may be implemented with various differences from the examples depicted and described.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine control actuators, such as a milliactuator and/or a microactuator, in some examples. Disk drive 15 thus comprises an actuator system that comprises actuator arm assembly 19 and primary actuator 20, and may further comprise any further fine control actuators, in various examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine control actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or nine or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is magnetically susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate control signals 38 applied to actuator arm assembly 19, including to control actuator 20. Actuator 20 functions as a primary actuator, and rotates actuator arm assembly 19 about an axial pivot in order to perform primary actuation of the corresponding heads 18 radially over the disk surfaces 17 in a direction that reduces the PES. Control circuitry 22 may also generate control signals 38 applied to control any fine control actuators, such as milliactuators and/or microactuators, in various examples. Control circuitry 22 may also apply control signals to and receive sensor signals from heads 18, including any detectors or sensors of heads 18, and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of two actuator arm assemblies may control half of heads 18, and write to and read from half of disk surfaces 17. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator system, in various examples. An actuator system comprising actuator arm assembly 19 may thus be configured to position heads 18, including a selected head among one or more heads 18, proximate to a corresponding disk surface 17 among the one or more disks 16. Each head 18 comprises a write element, an assistive energy emitter, an energizing interface coupled to the assistive energy emitter, and a detector. The assistive energy emitter is driven separately from driving of the write element.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, write protection circuitry 30 of control circuitry 22 may detect, via a detector of the selected head, an energy anomaly in an energizing interface of the selected head (82). Write protection circuitry 30 may further perform, in response to detecting the energy anomaly, a write protection process. As part of the write protection process, write protection circuitry 30 may detect, in response to detecting the energy anomaly, whether a previously written track yields an anomalous readback signal (84). As a further part of the write protection process, write protection circuitry 30 may rewrite, in response to detecting that the previously written track yields an anomalous readback signal, data designated for the previously written track to the previously written track (86). Control circuitry 22, including write protection circuitry 30, may further perform additional actions, methods, and techniques, in accordance with various aspects including as further described herein.

Figure 3:
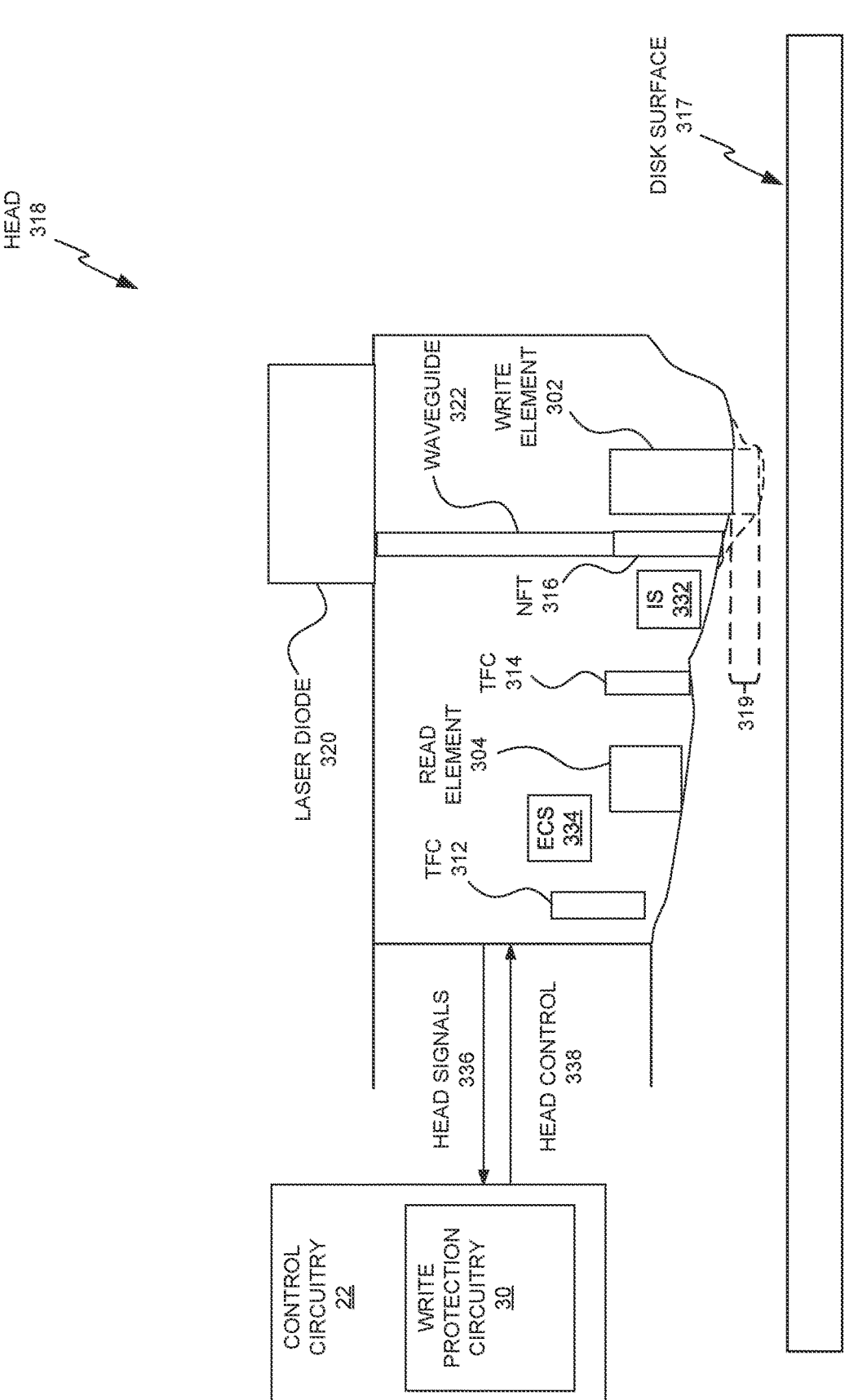
FIG. 3 depicts a conceptual side view diagram of a head of a disk drive, suspended above and operating proximate to a corresponding disk surface, under control of control circuitry and write protection circuitry, in accordance with various aspects of this disclosure.

FIG. 3 depicts a conceptual side view diagram of a head 318 of a disk drive, suspended above and operating proximate to a corresponding disk surface 317, under control of control circuitry 22 and write protection circuitry 30, in accordance with various aspects of this disclosure. Disk surface 317 and head 318 may be respective implementations of any of disk surfaces 17 and heads 18, respectively, as depicted in FIGS. 2A and 2B. FIG. 3 is a conceptual diagram and not an engineering schematic, and the elements depicted may be disposed in any of a variety of arrangements in different examples.

FIG. 3 depicts an illustrative context in which write protection circuitry 30 may detect, via a detector of head 318, an energy anomaly in an energizing interface of an energy-assisted write system of head 318; and perform, in response to detecting the energy anomaly, a write protection process for data written via head 318. Write protection circuitry 30 may perform rapid, real-time measurements of conditions, such as thermal, optical, power, amplitude, intensity, and/or voltage conditions, and of energy anomalies indicated by any one or more of those conditions, in or proximate to an energy interface, such as near-field transducer (NFT) 316, via one or more detectors, such as interface sensor (IS) 332.

Control circuitry 22 outputs head control signals 338 to head 318, and receives head signals 336, including control signals, data, and sensor signals such as from one or more energy interface sensors 332, from head 318. Head 318 includes a write element 302, a read element 304, thermal fly height (TFC) control elements 312 and 314, and energy interfaces. Illustratively, head 318 comprises energy interfaces including a laser-generating component such as a laser diode 320 configured for emitting a laser via the energy interfaces of waveguide 322 and NFT 316, in accordance with various aspects of this heat-assisted magnetic recording (HAMR) example of this disclosure. The laser induces a plasmon that heats a track on disk surface 317 that passes proximate to write element 302 as head 318 flies over or proximate to disk surface 317, thereby functioning for heat-assisted write operations in an example of energy-assisted write operations. FIG. 3 depicts changes 319 in protrusion and aerodynamic profile causing changes in fly height 315, or head-disk spacing, due to changing thermal and operating conditions in head 318 including write element 302.

Control circuitry 22 writes data to disk surface 317 by operating the laser to heat a track of disk surface 317 to a temperature within a nominal range of the Curie temperature of the disk surface medium, and modulating a write current in an inductive write coil in write element 302, to record magnetic transitions onto corresponding disk surface 317 in a process referred to as saturation recording. During readback, read element 304 (e.g., a magneto-resistive element) in head 318 senses the magnetic transitions, and a read channel demodulates the resulting read signal. HAMR enables high-quality written data at high densities enabled by a high-coercivity medium (e.g., comprising iron-platinum (FePt) nanoparticles) of disk surface 317, by heating disk surface 317 with a laser emitted by laser diode 320 via waveguide 322 and NFT 316 during write operations. Such heating of disk surface 317 decreases the coercivity and increases the magnetic susceptibility of the magnetic medium of disk surface 317, thereby enabling the magnetic field generated by the write coil of write element 302 to magnetize the temporarily heated area of disk surface 317. The disk surface encoding the data thus written then cools back down and thereby returns to heightened magnetic coercivity, which durably preserves the written data at higher density than is possible in conventional techniques such as conventional, non-energy-assisted perpendicular magnetic recording (PMR).

Any suitable technique may be employed to heat the surface of the disk in HAMR recording, such as with a laser-generating component such as laser diode 320 and NFT 316 disposed proximate to write element 302 of head 318. Since the quality of the write/read signal depends on the fly height of head 318, and various factors may interact in complex ways to induce changes to the fly height, head 318 may also comprise one or more fly height actuators (FHA) for modifying or controlling the fly height. Any type of fly height actuator may be employed, such as TFCs 312, 314 as in the example of FIG. 3, which control or influence fly height of head 318 above disk surface 317 through thermal expansion, or a piezoelectric (PZT) actuator (not included in the example of FIG. 3) that actuates through mechanical deflection, or other FHA embodiments, in other examples.

Head 318 comprises a write-assistance energizing emitter component, e.g., laser diode 320 in the example depicted in FIG. 3, or any other kind of thermally energizing component, in other implementations of this disclosure. The example of FIG. 3 is particularly described with respect to the example depicted in FIG. 3 in which the disk drive is a HAMR drive and the thermally energizing component is implemented as laser diode 320. A certain increment of laser current applied to laser diode 320 may nominally yield a regular, predictable, linear, or approximately linear amplitude of the laser in a small operating range, corresponding with a certain increment of power and voltage drawn by laser diode 320, power and optical amplitude of the emitted laser, and thermal change of and proximate to energy interfaces such as waveguide 322 and NFT 316, in various examples. Thereby, detecting an anomalous change in any of these variables by write protection circuitry 30 may be a useful indication to write protection circuitry 30 of an energy anomaly in the energy-assisted write process, and thus of potential anomaly in data recorded in current and recent write operations. The potential anomaly in the recorded data that write protection circuitry 30 may detect may be anything from data written with a slightly below or above nominal readback amplitude and track width, to total failure of the data write operation, due to any of various energy anomalies of various degrees of severity.

Interface sensor 332 may measure temperature, or equivalently, thermal energy, proximate to the example energy interface of NFT 316, in some examples. Head 318 further includes embedded contact sensor (ECS) 334, which measures temperature or thermal energy at another position of head 318. Since laser heating is localized proximate to NFT 316, including anomalous changes in laser heating due to energy anomalies, such as due to laser mode hops in laser diode 320, interface sensor 332 is well-suited for measuring changes in temperature due to laser heating and energy anomalies, such as laser mode hops. Laser mode hops are sudden changes in the dominant emission mode of laser diode 320 that are inherent to the physics of the laser diodes. Laser mode hops typically induce a sudden change in laser amplitude, non-linearly to the current applied by control circuitry 22 to laser diode 320. The sudden change may typically be of approximately five to ten percent of the laser amplitude, in some examples, typically as a reduction in laser amplitude in a majority of occurrences, and as an increase in laser amplitude in a minority of occurrences. Such an anomalous reduction or increase in laser amplitude may induce an anomalously too strong or too weak data write signal, even without any change in the write current applied to write element 302.

ECS 334 is positioned farther away from the path of the laser and may detect a temperature of head 318 with less sensitivity to anomalous changes in thermal energy at or proximate to an energy interface due to energy anomalies, in this example. ECS 334 may also be affected by some of the same measurement noise as interface sensor 332. Control circuitry 22 and write protection circuitry 30 may thus detect via both interface sensor 332 and ECS 334, such as by measuring a differential between interface sensor 332 and ECS 334, in some examples, which may cancel out some noise common to the measurement signals of both interface sensor 332 and ECS 334. By measuring the differential between interface sensor 332 and ECS 334, write protection circuitry 30 may thereby detect and measure changes in temperature proximate to interface sensor 332 and detect energy anomalies in NFT 316 with higher signal-to-noise ratio (SNR) than is possible via the signal from interface sensor 332 alone, in some examples. Interface sensor 332 and ECS 334 measure, in part, the efficiency of the laser in heating the media interface of disk surface 317. Write protection circuitry 30 may thus use the signals from interface sensor 332 and ECS 334 as an indicator of the integrity of laser performance of laser diode 320 for performing write operations, and as an indicator of any energy anomalies of any kind that anomalously depart from the expected nominal performance of the laser in performing write operations.

NFT 316 is an example implementation of an energizing interface of head 318 in an energy-assisted magnetic recording system. Interface sensor 332 and ECS 334 are example implementations of temperature sensors and of a temperature sensor system disposed on head 318, and interface sensor 332 is an example temperature sensor disposed proximate to an energizing interface of head 318. In other examples, head 318 may include any other kind of sensors disposed proximate to an energizing interface of head 318, and configured to sense any type of energy, including any type of energy anomaly in an energizing interface of head 318.

In some examples, since NFT 316 is the final energy interface of the path of the laser in head 318 prior to the laser emitting from head 318, detecting energy and any prospective energy anomalies at NFT 316 at least in part via interface sensor 332 or another detector disposed proximate to NFT 316 may enable write protection circuitry 30 to make highly accurate and precise detection and characterization of energy anomalies in the write assistance energizing system of head 318. This may include detecting energy either exclusively via interface sensor 332, or via interface sensor 332 and one or more additional detectors, such as via both interface sensor 332 and ECS 334, in various examples.

In other examples, write protection circuitry 30 may be configured to make highly accurate and precise detection and characterization of energy anomalies at or in the write assistance energizing system of head 318 via any other sensor system of one or more sensors of head 318, disposed in or on head 318 or a slider on which head 318 is mounted. Write protection circuitry 30 may be configured via sensors disposed primarily to detect energy proximate to waveguide 332, laser diode 320, and/or the volume external to head 318 between NFT 316 and the opposing disk surface 317, in which the laser-induced plasmon heats a track along disk surface 317, in various examples.

Head 318 thus comprises a write element 302, an assistive energy emitter in the form of laser diode 320, an energizing interface comprising waveguide 322 and NFT 324 which are coupled to the assistive energy emitter, and detectors, in the form of interface sensor 332 and ECS 334. Laser diode 320 is an assistive energy emitter and emits energy for assisting the write process for energy-assisted magnetic recording (HAMR in this case). The assistive energy emitter, i.e. laser diode 320 in this example, is driven separately from driving of the write element 302, in that write protection circuitry 30 applies current and power to laser diode 320 separately from applying current and power to write element 302.

In other examples in MAMR implementations of this disclosure, write protection circuitry 30 may be configured to make highly accurate and precise detection and characterization of energy anomalies in the MAMR write assistance energizing system of head 318 via any other sensor system of one or more sensors disposed to detect energy at or proximate to an assistive energy emitter in the form of a magnetron or other microwave emitter, microwave waveguide, and region exterior to the slider, and/or any other MAMR energy interface. In various examples, write protection circuitry 30 may be configured to detect energy anomalies in the write assistance energizing system of head 318 via any one or more detectors configured to detect thermal energy or temperature of any component of head 318 or region exterior to head 318, or configured to detect optical or electromagnetic intensity, amplitude, power, or voltage of a laser, microwave, or any other optical emission of any wavelength profile. In various examples, write protection circuitry 30 may be configured to detect energy anomalies in the write assistance energizing system of head 318 via any one or more detectors configured to detect power or voltage or current drawn by or applied to laser diode 320, a magnetron or other microwave emitter, or any other optical or other energy emission source of an energizing interface.

For purposes of this disclosure, an energizing interface may include any energy-conducting component or any energy-emitting component. An energy-conducting component may comprise NFT 316 and/or waveguide 322 in the example of FIG. 3, or any optical fiber or transparent dielectric waveguide in various optical implementations, or a microwave waveguide in a MAMR implementation, or any other optical or electromagnetic waveguide or energy-conducting component of any wavelength profile, or a thermal energy conductor, or any other component configured for conducting energy in any form, in various examples. An energy-emitting component may comprise laser diode 320 in the example of FIG. 3, or a magnetron or other microwave emitter in a MAMR implementation, or any other optical or electromagnetic emitter of any wavelength profile, or any other component configured for emitting energy in any form, in various examples.

An energizing interface of this disclosure may also include a plasmon or electromagnetic emission or other form of energy emitted or induced by head 318 and/or external to head 318 that is induced by one or more energizing interfaces comprised in head 318. One or more sensors may be configured to detect energy of the plasmon or electromagnetic emission or other form of energy external to head 318, and write protection circuitry 30 may detect energy, and energy anomalies, in the external energizing interface via one or more of such externally facing sensors, or via any combination of sensors configured to detect energy in any internal and/or external energizing interface.

Write protection circuitry 30 may detect energy in NFT 316 primarily or exclusively via interface sensor 332, in some examples. Write protection circuitry 30 may detect energy in NFT 316 and/or waveguide 322 via ECS 334 or a combination interface sensor 332 and ECS 334, such as a differential between interface sensor 332 and ECS 334, in some examples. Write protection circuitry 30 may detect energy in a microwave waveguide via an ECS analogous to ECS 334 in MAMR implementations, in some examples.

Write protection circuitry 30 may detect energy in any of these energizing interfaces or an energizing interface in any form via one or more detectors or sensors configured to detect energy in any form, in any implementation, in various examples. In some examples, a selected head (e.g., head 318) comprises a laser emitting component (e.g., laser diode

320), and the energizing interface comprises an optical interface (e.g., NFT 316, waveguide 322) operatively coupled to the laser emitting component. In some examples, write protection circuitry 30 detects via a detector comprising a thermal detector configured to sense thermal energy at (e.g., in, proximate to, in approximately isothermal contact with) the optical interface. In some examples, write protection circuitry 30 detects via a detector comprising an optical detector configured to sense optical amplitude in the optical interface. In some examples, write protection circuitry 30 detects via a detector comprising a power detector configured to sense power emitted by the laser emitting component or via the optical interface. In some examples, write protection circuitry 30 detects via a detector comprising a voltage detector configured to sense voltage drawn by the laser emitting component. In some examples, write protection circuitry 30 detects via a detector comprising any one or more of the detectors described herein.

In some MAMR examples, the selected head 318 further comprises a microwave emitting component, and the energizing interface comprises one or more of the microwave emitting component, and a microwave interface operatively coupled to the microwave emitting component. In some examples, write protection circuitry 30 detects via a detector comprising a thermal detector configured to sense thermal energy at (e.g., in, proximate to, in approximately isothermal contact with) the microwave interface. In some examples, write protection circuitry 30 detects via a detector comprising a microwave detector configured to sense microwave amplitude in the microwave interface. In some examples, write protection circuitry 30 detects via a detector comprising a power detector configured to sense power emitted by the microwave emitting component or via the microwave interface. In some examples, write protection circuitry 30 detects via a detector comprising a voltage detector configured to sense voltage drawn by the microwave emitting component.

In some examples, write protection circuitry 30 is configured such that detecting the energy anomaly in the energizing interface comprises detecting effects on an emitted laser of a laser mode hop in laser diode 320. In some examples, write protection circuitry 30 is configured such that detecting the energy anomaly in the energizing interface comprises detecting effects on an emitted laser of an anomalous chemical accumulation on or proximate to NFT 316, or on or proximate to any of the energizing interfaces described herein. In some examples, write protection circuitry 30 is configured such that detecting the energy anomaly in the energizing interface comprises detecting effects on an emitted laser of an anomalous chemical corrosion of or proximate to NFT 316, or of or proximate to any of the energizing interfaces described herein. In some examples, write protection circuitry 30 is configured such that detecting the energy anomaly in the energizing interface comprises detecting effects on an emitted laser of a mechanical scratch or other mechanical damage on or proximate to NFT 316, or any of the energizing interfaces described herein. In some examples, write protection circuitry 30 is configured such that detecting the energy anomaly in the energizing interface comprises detecting effects on any emitting component or any conducting or transmitting component for a laser, a microwave emission, or any other kind of energy, of any one or more of the causes of energy anomalies described herein or any others.

Figure 4:
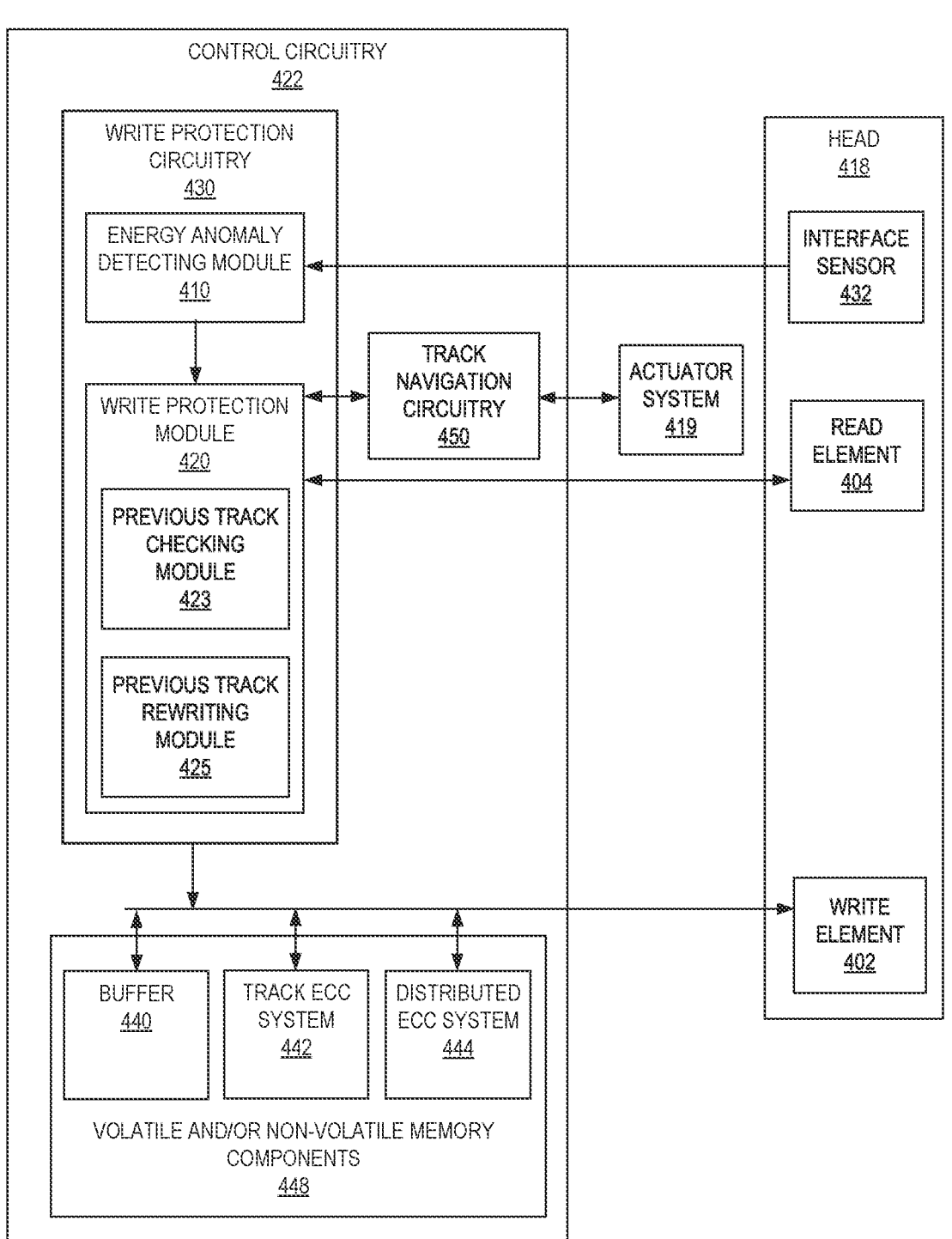
FIG. 4 depicts a conceptual block diagram of control circuitry comprising write protection circuitry interacting with an actuator system and elements of a head, in accordance with various aspects of this disclosure.

FIG. 4 depicts a conceptual block diagram of control circuitry 422 comprising write protection circuitry 430 interacting with an actuator system 419 and elements of a head

418, in accordance with various aspects of this disclosure. Control circuitry 422, write protection circuitry 430, actuator system 419, and head 418 are example implementations of control circuitry 22, write protection circuitry 30, actuator system 19, and heads 18, 318 as shown in FIGS. 2A-2C and FIG. 3 and as described above with reference thereto. FIG. 4 is a conceptual diagram and not an engineering schematic, and the elements depicted may be disposed in any of a variety of arrangements, in different examples.

Write protection circuitry 430 includes energy anomaly detecting module 410 and write protection module 420, and interacts with buffer 440, track error correction code (ECC) system 442, and distributed ECC system 444 comprised in control circuitry 422. Write protection circuitry 430 may also comprise buffer 440, track ECC system 442, and distributed ECC system 444 in some examples. Control circuitry 422 also comprises track navigation circuitry 450 for navigating head 418 proximate to its corresponding disk surface (not depicted in FIG. 4). Head 418 comprises write element 402, read element 404, and interface sensor 432, analogous to write element 302, read element 304, and interface sensor 332 depicted in FIG. 3 and described above with reference thereto.

Energy anomaly detecting module 410 detects, via one or more detectors of head 418, illustratively such as interface sensor 432, an energy anomaly in an energizing interface of head 418 (e.g., an anomalous temperature at an NFT), as described above (e.g., 82 in FIG. 2C). Write protection module 420 performs, in response to detecting the energy anomaly, a write protection process, as described above (e.g., 84 and 86 in FIG. 2C). Write protection module 420 may comprise previous track checking module 423 and previous track rewriting module 425, in some examples. In particular, as part of a write protection process, write protection module 420 (e.g., via previous track checking module 423) may detect, in response to detecting the energy anomaly, whether a previously written track yields an anomalous readback signal (e.g., 84 in FIG. 2C). As a further part of the write protection process, write protection module 420 (e.g., via previous track rewriting module 425) may rewrite, in response to detecting that the previously written track yields an anomalous readback signal, data designated for the previously written track to the previously written track (e.g., 86 in FIG. 2C).

To perform an example write protection process, write protection module 420 may navigate, via track navigation circuitry 450 and actuator system 419, head 418 to a previously written track, sector, or track portion. Write protection module 420 may then perform a read operation, via read element 404, of the recently written data of the previously written track, sector, or track portion, to attempt to read the recently written data. Write protection module 420 may detect whether the previously written track yields an eroded, absent, or otherwise anomalous readback signal. If write protection module 420 detects an anomalous readback signal for the recently written data, write protection module 420 may rewrite, via write element 402, in response to detecting that the previously written track, sector, or track portion yields the anomalous readback signal, data designated for the previously written track, sector, or track portion to the previously written track, sector, or track portion.

Write protection module 420 may further perform a write protection process iteratively or recursively to provide write protection coverage for any determined amount of recently written data, up to a worst case maximum possible amount of previously written data that may have been eroded, squeezed, or otherwise anomalously affected by any kind of write assistance energy anomaly, within the maximum interval before such energy anomaly could have been detected by write protection circuitry 430. This may include anomalously affected data from an anomalous write in a same track or from an anomalous energy squeeze in an adjacent track or other proximate track to the track being written during the energy anomaly. Thus, write protection module 420 detecting whether a previously written track yields an anomalous readback signal may comprise write protection module 420 detecting whether a most recently written track yields an anomalous readback signal, and detecting whether one or more tracks written previously to the most recently written track yield an anomalous readback signal. Energy anomaly detecting module 410 and write protection module 420 may either be separate modules, elements, or components as conceptually depicted in FIG. 4 or may be partly or entirely integrated in a single, unified module, element, or component, in various examples.

Energy anomaly detecting module 410 and write protection module 420 may include firmware, programs, objects, methods, routines, components, logic, data structures, and/or other elements that firmware, hardware, and/or software of write protection circuitry 430 may use to carry out functions and/or methods of examples as described herein. The term "module" here may refer to any portion or collection of firmware, hardware, software, and/or data structures in any form, and is not limited to any potential more restricted meaning of the term "module" that may be used in other contexts or technical domains. These modules of write protection circuitry 430 are executable by write protection circuitry 430 to perform the inventive methods as described herein. Write protection circuitry 430 may include additional or fewer modules than those shown in FIG. 4. In various examples, separate modules of write protection circuitry 430 as shown in FIG. 4 may be integrated into a single module. Additionally, or alternatively, a single module of write protection circuitry 430 as shown in FIG. 4 may be implemented as multiple modules in various examples.

Control circuitry 422 comprises volatile and/or non-volatile memory components 448, portions of which control circuitry 422 and write protection circuitry 430 use to implement buffer 440, track ECC system 442, and distributed ECC system 444, and portions of which control circuitry 422 and write protection circuitry 430 may use for other functions, in various examples. Buffer 440, track ECC system 442, and distributed ECC system 444 as depicted in FIG. 4 are illustrative examples, and some example implementations may include a plurality of buffers, and/or a plurality of ECC systems, and/or one or more further elements, such as one or more media caches or other caches, one or more magnetoresistive random-access memory (MRAM) components, and one or more byte-addressable persistent memory components, in various examples. Buffer 440 may also comprise one or more of an MRAM component and a byte-addressable persistent memory component, in various examples. In various examples, write protection circuitry 430 may receive and temporarily store write data in buffer 440, which may comprise one or more write staging buffers.

As depicted, write protection circuitry 430 may implement buffer 440 in any form of volatile and/or non-volatile memory components 448, in different examples. Volatile and/or non-volatile memory components 448 may include inherently non-volatile memory components and/or effectively non-volatile memory components. That is, write protection circuitry 430 may comprise and implement memory components that are intrinsically and traditionally volatile but that write protection circuitry 430 may implement as redundantly powered and power-protected volatile memory that effectively behaves and functions like non-volatile memory for all practical purposes.

Write protection circuitry 430 may use internal, failover, and/or redundant power sources to implement such redundantly powered and power-protected volatile memory. For example, buffer 440 may comprise one or more dynamic random-access memory (DRAM) components, and control circuitry 422 may be configured to detect any loss of external and/or nominal power, and in response, use the spindle motor back electromagnetic force (BEMF) of the disk drive as a backup generator power source to power transfer of all data from one or more DRAM or other volatile memory components to one or more intrinsically non-volatile memory components, such as one or more NAND flash memory components. Disk drive 15 and control circuitry 422 may be configured with at least enough such backup power capacity to transfer the entire memory capacity of any or all volatile memory components to non-volatile memory, in various examples.

Control circuitry 422 may also be configured with a large enough buffer 440 relative to the backup power capabilities of the disk drive that buffer 440 is capable of storing more data than can be transferred to intrinsically nonvolatile memory in case of an emergency loss of external power, in some examples. In these examples, control circuitry 422 and write protection circuitry 430 may be configured to implement volatile memory prioritization management, to prioritize what data from buffer 440 to transfer to intrinsically nonvolatile memory in case of an emergency loss of external power. Control circuitry 422 may also use other backup power sources in other examples. Buffer 440 itself may also comprise inherently non-volatile memory components such as one or more NAND flash memory or other flash memory components, in various examples.

Buffer 440 may thus comprise one or more of one or more redundantly powered DRAM components and one or more NAND flash memory components, in various examples. Write protection circuitry 430 may thus blur the lines between volatile and non-volatile memory components, in various examples. Write protection circuitry 430 may implement one or more write staging buffers 440 in one or more power-protected DRAM components, and combine the cost and performance of DRAM with the power protection of effectively non-volatile memory, in various examples. Write protection circuitry 430 may also implement a staging buffer 440 in any form or combination of one or more volatile, power-protected volatile, and non-volatile memory components, in various examples.

Write protection circuitry 430 may perform data write protection processes such as those described herein with little or no impact to data throughput and write performance, in various examples. Write protection circuitry 430 may be configured to perform data write staging and asynchronous write operations, with substantial throughput and timing margins, in various examples. Write protection circuitry 430 may maintain data to be written in a staging buffer such as buffer 440, and may use the same data from buffer 440 again to rewrite the data to the same one or more sectors or tracks, in various examples. In some examples, write protection circuitry 430 may be configured with a large enough buffer 440 to store and rewrite all write data that are statistically likely or possible in a worst-case scenario to be written anomalously due to an energy anomaly, before write protection circuitry 430 detects the energy anomaly.

In other examples, write protection circuitry 430 may perform a write protection process in response to detecting a write assist energy anomaly and, as part of the write protection process, check whether all write data for the write operation impacted by the energy anomaly (or "the impacted data") are still stored in buffer 440. As part of the write protection process, write protection circuitry 430 may determine that the impacted data are no longer still stored in buffer 440. As part of the write protection process, in response to determining that the impacted data are no longer still stored in buffer 440, write protection circuitry 430 may then recreate the impacted data from one or more sources of error correction code (ECC) information, and/or one or more other resources, in various examples. Write protection circuitry 430 may recreate the impacted data from track ECC information from track ECC system 442, and/or from distributed ECC information from distributed ECC system 444, in various examples. Track ECC system 442 may be configured to maintain ECC information and perform ECC processes with respect to single tracks, while distributed ECC system 444 may be configured to maintain ECC information and perform ECC processes with respect to data distributed across the disk surface, and independently from and redundantly with track ECC system 442, in various examples.

In various examples, write protection circuitry 430 may check whether it still has anomaly-impacted data stored in buffer 440 and may be enabled to rewrite the data from buffer 440 in many but not all occurrences, and may then employ a backup process to write the data again. In some examples, write protection circuitry 430 may determine that the data to be rewritten is no longer in buffer 440, and then use track ECC information from track ECC system 442 to recreate the data for one or more sectors of the previous track. In some examples, write protection circuitry 430 may be enabled to guarantee rapid rewriting of any data lost to an energy anomaly, including in statistical worst case scenarios, using either data from buffer 440 or data recreated from track ECC information from track ECC system 442.

In some examples, write protection circuitry 430 may be configured to determine whether the data is neither still stored in the buffer nor susceptible of being recreated from track ECC information from track ECC system 442. In that event, write protection circuitry 430 may be configured then to recreate the anomalously written data from distributed ECC information from distributed ECC system 444. For example, some implementations of the disk drive may be enabled to use shingle magnetic recording (SMR), and may be enabled to process distributed ECC information with distributed ECC system 444 independently of track ECC information with track ECC system 442 for purposes of implementing SMR processes. The distributed ECC information for the subject data may persist after the subject data is no longer stored in buffer 440 or is susceptible of being recreated from the track ECC information, in some examples.

Write protection circuitry 430 may use the distributed ECC information as a second backup layer, and a third layer overall, to draw from to rewrite the data affected by the energy anomaly in the write assistance energy interface. Control circuitry 422 may also draw from one or more asynchronous staging buffers, other buffers, track ECC information, other independent ECC information, and other types of stages, sources, information, or repositories for recreating and/or rewriting anomaly-impacted data in other examples, and in any sequential, parallel, or mixed order of precedence from which to recreate and/or rewrite the data, in various examples.

Write protection circuitry 430 may remediate recent data write operations it determines to have been anomalously impacted by energy anomalies both in prior sectors in a same track in which head 418 was writing at the time write protection circuitry 430 detected the energy anomaly, and in previously written tracks, and in adjacent and proximate tracks that are adjacent or proximate to the same track, in various examples. Recently written data in both a same track and one or more prior tracks may have been affected by a newly detected energy anomaly in the write operation process. Data in adjacent and proximate tracks may also have been impacted by adjacent track squeeze, in the case of positive energy anomalies in which the energy has become anomalously higher than predicted or intended, such as may occur in a minority of laser mode hops. Anomalously higher energy is likely to induce anomalously strong and wide track width, and squeeze or erode adjacent tracks, or even proximate tracks two or more tracks away from the subject track of the anomalous write operation, in various examples. The data for the adjacent or other proximate tracks subjected to such squeeze erosion may also have been written recently and may also be recoverable by write protection circuitry 430 from one or more buffers such as buffer 440, one or more ECC information sources such as track ECC system 442 or distributed ECC system 444, or other resources. Write protection circuitry 430 may thus remediate data write operations to recent writes both to a same track and to adjacent tracks and other proximate tracks, in various examples.

Write protection circuitry 430 may be enabled to perform the entirety of the write-assistance energy anomaly detection and remediation process entirely within its throughput and timing margins, even for worst case, extreme statistical outliers of high rates of energy anomalies, in various examples. In this way, write protection circuitry 430 is enabled to provide energy-assisted write protection with zero impact on data throughput or latency, in various examples. Write protection circuitry 430 may also perform energy anomaly detection and energy assistance write protection with little or negligible or other non-zero impact on data throughput, in other examples.

The systems, components, features, techniques, and methods described herein may be applied and used in both conventional magnetic recording (CMR) and shingle magnetic recording (SMR), in various examples. For example, write protection circuitry 430 may use SMR-specific distributed ECC information as one potential source from which to recreate data for a write operation impacted by an energy anomaly. Various aspects described herein may also be highly advantageous in CMR implementations.

Write protection circuitry 430 may be configured to detect write mechanism failures in any type of energy-assisted recording, such as in HAMR or in MAMR (e.g., detecting write failures via ECS 334), in various examples. Write protection circuitry 430 may be configured to detect write mechanism failures that are short-term, in many instances, such as due to laser mode hops in examples of HAMR or some instances of chemical corrosion, chemical smear buildup, or other chemical impacts to an energy interface, or anomalous reflection of energy between head 418 and the disk surface, such as due to temporarily anomalously low fly height of head 418. Write protection circuitry 430 may be configured to detect write mechanism failures that are long-term, in many instances, such as due to some instances of chemical corrosion, chemical smear buildup, or other chemical impacts; scratches; or permanent failure of the laser diode, for example.

Write protection circuitry 430 may further be configured to detect write mechanism failures that are intermediate-term, that are not permanent component failures, but that persist longer than short-term failures such as a single laser mode hop. As an illustrative example, in some implementations, laser diode 320 may be capable of entering into a laser mode hop oscillatory instability in which a series of two or more laser mode hops recur in rapid sequence. Write protection circuitry 430 may be configured to detect energy anomalies indicative of a selected number (e.g., 2, 3, 4, etc.) of rapidly sequential laser mode hops.

Write protection circuitry 430 may be configured to respond differently depending on if it determines an energy anomaly to be short-term, intermediate-term, or long-term, in various examples. In short-term causes of energy anomaly, write protection circuitry 430 may detect energy return to nominal in the energizing interface, and may use the detected return to nominal energy as a prerequisite for performing write protection process rewrite attempts to the recently written tracks, sectors, or other track portions. Write protection circuitry 430 may be configured to resume writing data designated for a current track to the current track, in response to detecting nominal energy in the energizing interface and after rewriting the data designated for the previously written track to the previously written track.

Write protection circuitry 430 may be configured to detect and respond to intermediate-term energy anomalies, such as a selected number of rapid sequence laser mode hops, by escalating the write performance process. Write protection circuitry 430 may be configured such that performing the write protection process comprises performing, in response to detecting a plurality of energy anomalies in a selected timespan, such as a rapid series of a selected number of laser mode hops, an escalated write protection process. Write protection circuitry 430 may be further configured such that performing the escalated write protection process comprises writing a current set of data to a cache, such as a media cache, a more persistent cache in buffer 440, or other alternative intermediate-term or long-term data storage resource.

In some examples, control circuitry 22 may be configured to perform individual write operations across two or more heads simultaneously, concurrently, or in parallel. For example, control circuitry 22 may be configured to stripe data to be written in striping across multiple heads simultaneously to multiple corresponding disk surfaces. All such striped, simultaneous, parallel, or other concurrent write operations using multiple heads for a single write operation of a single set of data designated for the write operation may be referred to as concurrent write operations. In various examples, write protection circuitry 430 may be configured to detect an energy anomaly in one of the heads involved in control circuitry 22 performing a concurrent write operation. Write protection circuitry 430 may be configured to respond to an energy anomaly in one of the heads involved in control circuitry 22 performing a concurrent write operation by performing, in response to detecting the energy anomaly, a write protection process for the concurrent write operation. The write protection process for the concurrent write operation may be designed to remediate the impact of the energy anomaly on the concurrent write operation taking into account the context of the concurrent write operation. For example, write protection circuitry 430 performing a concurrent write operation write protection process and detecting a persistent energy anomaly in one of the heads involved in the concurrent write operation may assess the alternative write destinations available to it in the concurrent write process for data impacted by the detected energy anomaly. Write protection circuitry 430 may select a fastest, most efficient, or otherwise advantageous alternative write destination to which to write the data impacted by the detected energy anomaly. As part of this selecting an alternative write destination, write protection circuitry 430 may opt to redirect the data impacted by the detected energy anomaly to be written by another head from among one or more additional heads involved in the concurrent write operation, or may redirect the data to a buffer, a media cache, another head not previously involved in the concurrent write operation for writing to another disk surface, or any other advantageous memory or data storage destination, in different examples. Write protection circuitry 430 may thus also be particularly advantageous in examples directed to concurrent write access configurations.

Figure 5:
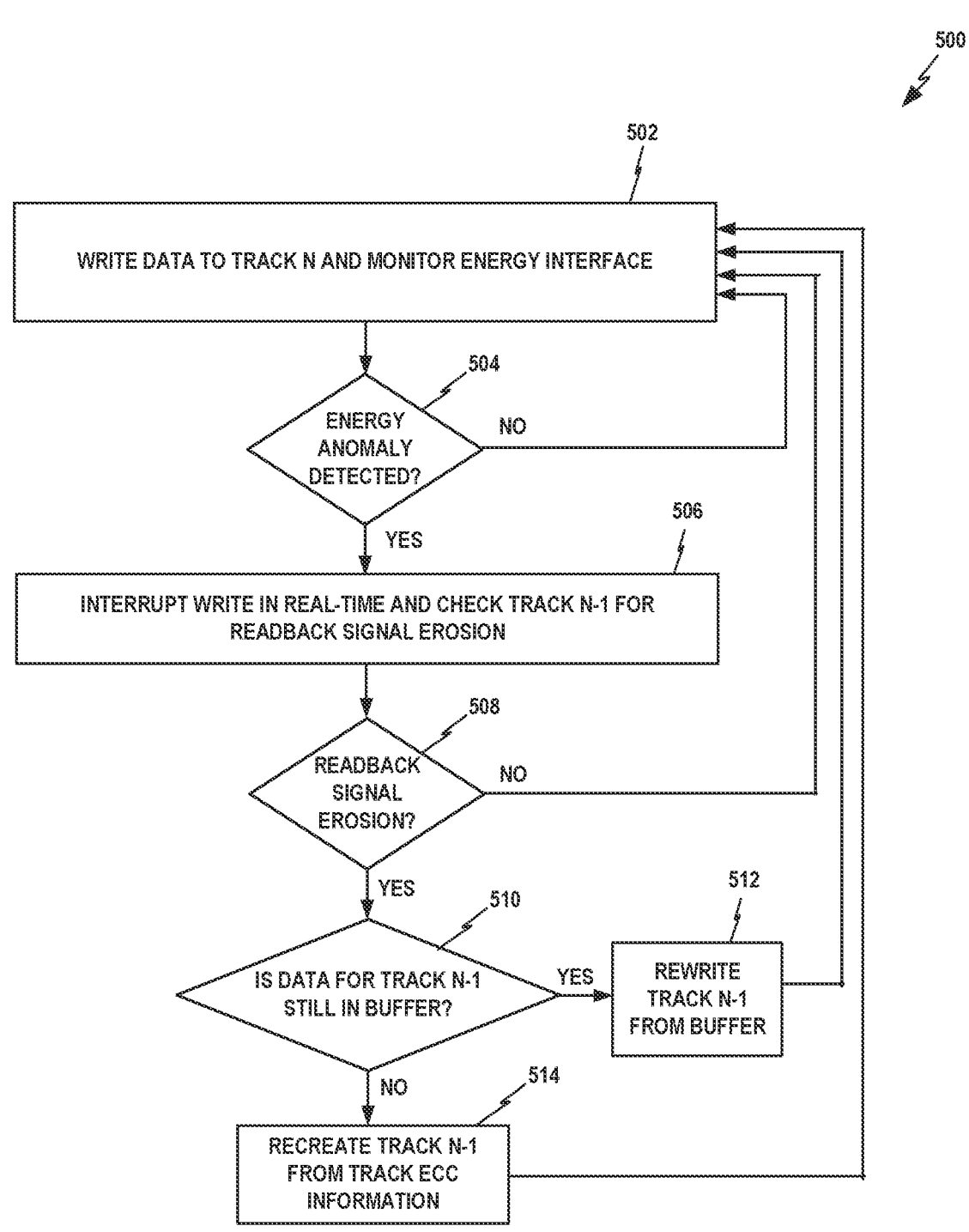
FIG. 5 depicts a flowchart for a method that control circuitry, including write protection circuitry, may perform, in accordance with various aspects of this disclosure.

FIG. 5 depicts a flowchart for a method 500 that control circuitry 22 or control circuitry 422 (hereafter illustratively control circuitry 422), including write protection circuitry 30 or write protection circuitry 430 (hereafter illustratively write protection circuitry 430), may perform, in accordance with various aspects of this disclosure. Write protection circuitry 430 monitors the energy interface of head 318 (e.g., monitors energy in NFT 318 via interface sensor 332) while control circuitry 422 performs a write operation to write data to a track N of disk surface 317 (502). Write protection circuitry 430 assesses whether the energy interface signals are nominal or whether it detects an energy anomaly (504). As long as write protection circuitry 430 does not detect an energy anomaly, it continues monitoring the energy interface (502). If write protection circuitry 430 detects an energy anomaly, then write protection circuitry 430 interrupts the write operation in real-time and checks a recently written track N−1, e.g., a most recently written track, for readback signal erosion or anomalous readback signal, e.g., an anomalously low-amplitude or anomalously high-amplitude readback signal, from the recently written track (506).

Write protection circuitry 430 assesses whether it detects readback signal erosion or anomalous readback signal (508). If write protection circuitry 430 does not detect a readback signal erosion or anomaly, write protection circuitry 430 returns the head back to the current track position of the current write, returns control of the head back to control circuitry 422, and returns to monitoring the energy interface (502). If write protection circuitry 430 does detect a readback signal erosion or anomaly, write protection circuitry 430 may check buffer 440 for whether it still retains the data designated and intended for being written to the track portion that yields the anomalous readback signal from buffer 440 (510).

In some other examples (not depicted in FIG. 5), buffer 440 is large enough and is configured to guarantee retaining all data at least as long as could possibly be affected by even a worst case write assistance energy anomaly within the detection and write protection process remediation capabilities of write protection circuitry 430. In such examples, if write protection circuitry 430 does detect a readback signal erosion or anomaly, from its assessment thereof (508), write protection circuitry 430 may simply retrieve from buffer 440 the data designated and intended for being written to the track portion that yields the anomalous readback signal.

Returning to the example of FIG. 5, if write protection circuitry 430 does detect that buffer 440 still retains the data designated for being written to the track portion that yields the anomalous readback signal (510), write protection circuitry 430 rewrites the data designated for being written to the track portion, to the designated track portion, from buffer 440 (512). If write protection circuitry 430 detects that buffer 440 no longer still retains the data designated for being written to the track portion that yields the anomalous readback signal (510), write protection circuitry 430 recreates and rewrites the data designated for being written to the track portion, to the designated track portion, from track ECC information from track ECC system 442 (514). In other words, write protection circuitry 430 determines that the data designated for the previously written track is not stored in buffer 440; recreates the data designated for the previously written track from track ECC information from track ECC system 442; and writes the recreated data to the previously written track. In either case, write protection circuitry 430 may continue checking previously written tracks and rewriting anomaly-impacted previously written data until it has rewritten all impacted data to all previously written tracks, sectors, or track portions. Write protection circuitry 430 then returns head 418 to performing a current write operation under control of other elements of control circuitry 422.

In the example of FIG. 5, write protection circuitry 430, buffer 440, and track ECC system 442 may be configured to guarantee being able to rewrite all data that could possibly be affected by even a worst case write assistance energy anomaly. In various examples, write protection circuitry 430, buffer 440, and track ECC system 442 may be further configured to guarantee being enabled to rewrite all data that could possibly be affected by even a worst case write assistance energy anomaly, within the asynchronously staged write timing margins of nominal write operations, such that write protection circuitry 430 may even guarantee rewriting all possible energy anomaly-impacted data with zero impact on throughput for current write operations.

Figure 6:
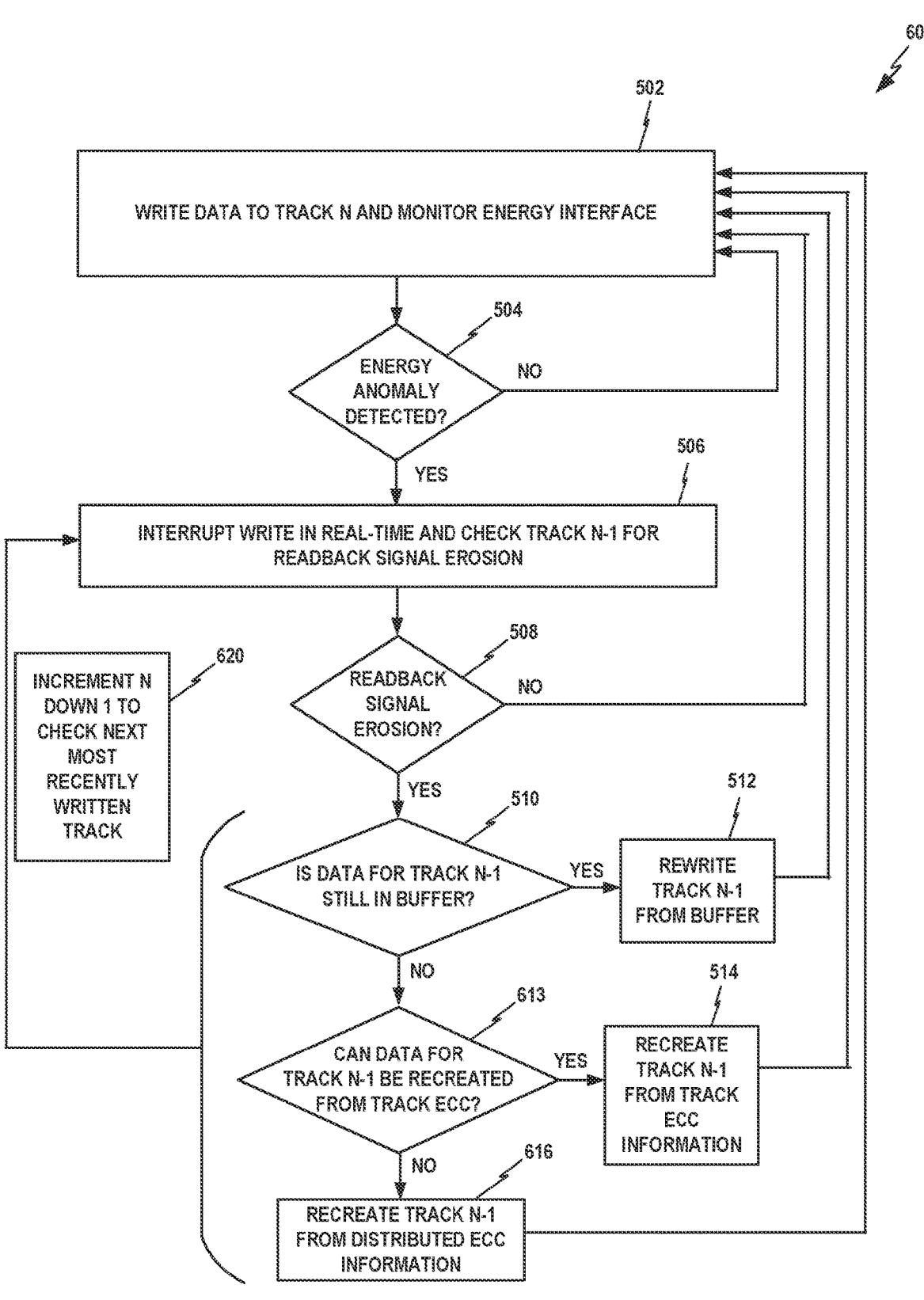
FIG. 6 depicts a flowchart for a method that control circuitry, including write protection circuitry, may perform, in accordance with various aspects of this disclosure.

FIG. 6 depicts a flowchart for a method 600 that control circuitry 422 including write protection circuitry 430 may perform, in accordance with various aspects of this disclosure. Method 600 incorporates much of method 500 as depicted in FIG. 5 and described above. The identically numbered elements in method 600 are the same as those in method 500 as described above. Method 600 may be differentiated from method 500 in that method 500 may be performed in examples in which write protection circuitry 430 is configured to be enabled to guarantee that all of the data for any recently written tracks that might be affected by a detected energy anomaly either remain stored in buffer 400 or are capable of being recreated from track ECC information from track ECC system 442. In contrast, method 600 may be performed in examples in which write protection circuitry 430 is not configured to be enabled to guarantee that all of the data for any recently written tracks that might be affected by an energy anomaly either remain stored in buffer 440 or are capable of being recreated from track ECC information.

However, in examples in which method 600 is applicable, write protection circuitry 430 is configured to be enabled to guarantee that all of the data for any recently written tracks that might be affected by an energy anomaly either remain stored in buffer 440, or are capable of being recreated from track ECC information, or are capable of being recreated from distributed ECC information from distributed ECC system 444. Distributed ECC information may thus provide a third layer, and a second redundant backup layer, from which recently written data may be either retrieved or recreated, in various examples. Distributed ECC information may be particularly applicable in examples of disk drive 15 implemented for shingle magnetic recording (SMR), in some examples.

In method 600, if write protection circuitry 430 determines that at least a portion of the data designated for track N–1 is not still in the buffer (510), write protection circuitry 430 determines whether the data designated for track N–1 can be recreated from track ECC information from track ECC system 442 (613). If write protection circuitry 430 determines that the data designated for track N–1 can be recreated from track ECC information, write protection circuitry 430 recreates and rewrites the data designated for track N–1 from track ECC information (514, as in FIG. 5). If write protection circuitry 430 determines that the data designated for track N–1 cannot be recreated from track ECC information, then write protection circuitry 430 recreates and rewrites the data designated for track N–1 from distributed ECC information from distributed ECC system 444 (616). In other words, write protection circuitry 430 determines that the data designated for the previously written track is not stored in buffer 440 and is not recoverable from track ECC information; then recreates the data designated for the previously written track from distributed ECC information from distributed ECC system 444; and writes the recreated data recreated from the distributed ECC information to the previously written track. Again, in either case, once write protection circuitry 430 has rewritten the data that had been impacted by the energy anomaly in the energy interface, control circuitry 422 returns to writing current or new data to a track N, and write protection circuitry 430 continues monitoring the energy interface.

In method 600, in some examples, write protection circuitry 430 also, after confirming where the data to be rewritten can be retrieved or recreated from, and rewriting the data (510, 512, 613, 514, 616), may then increment N down by 1 to check the next most recently written track (620), and may then check track N–1 for readback signal erosion/readback signal anomaly (506), where track N–1 is now the next most recently written track. Thus, after repairing any anomalously written data on the most recently written track, write protection circuitry 430 may scan or read the next most recently written track to confirm whether its recently written data yields a nominal readback signal. If write protection circuitry 430 detects anomalous readback signals from that next most recently written track, write protection circuitry 430 may also rewrite, and recreate if necessary, the data for that next most recently written track, also from a buffer, ECC information, or other source. Write protection circuitry 430 may perform this process recursively, and read additional recently written tracks and repair or rewrite them if needed, until write protection circuitry 430 sufficiently verifies that all recently written data impacted by an energy anomaly has been rewritten nominally, in various examples.

In all instances described herein wherein reference is made to write protection circuitry 430 reading and rewriting a track, the track is an illustrative example of a portion of written data that write protection circuitry 430 may read and rewrite if needed. Write protection circuitry 430 may also read and rewrite individual sectors, or any other portions of tracks, portions of sectors, or other portions of written data. In all instances described herein wherein reference is made to write protection circuitry 430 performing a write protection process and recreating and/or rewriting data from the illustrative examples of a buffer or from track ECC information, write protection circuitry 430 performing a write protection process may also include write protection circuitry 430 detecting and/or retrieving the impacted data from any applicable source and/or detecting and/or recreating information from which the impacted data may be recreated from any applicable source, and write protection circuitry 430 rewriting the data from any applicable source.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure.

Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator system configured to position a selected head among one or more heads proximate to a corresponding disk surface among the one or more disks; and
   one or more processing devices,
   wherein the selected head comprises a write element, an assistive energy emitter, an energizing interface coupled to the assistive energy emitter, and a detector,
   wherein the assistive energy emitter is driven separately from driving of the write element, and
   wherein the one or more processing devices, individually or in combination, are configured to:
      detect, via the detector, an energy anomaly at the energizing interface during a write operation;
      interrupt the write operation in real time in response to detecting the energy anomaly, and detect whether a previously written track yields an anomalous readback signal comprising an anomalously low-amplitude readback signal or an anomalously high-amplitude readback signal; and
      rewrite, in response to detecting that the previously written track yields an anomalous readback signal, data designated for the previously written track to the previously written track.

2. The data storage device of claim 1, wherein the one or more processing devices, individually or in combination, are further configured such that rewriting the data designated for the previously written track to the previously written track comprises:
   determining that the data designated for the previously written track remains stored in a buffer; and rewriting the data designated for the previously written track from the buffer to the previously written track.

3. The data storage device of claim 2, wherein the one or more processing devices, individually or in combination, are further configured such that rewriting the data designated for the previously written track to the previously written track comprises:

determining that the data designated for the previously written track is not stored in a buffer;

recreating the data designated for the previously written track from track error correction code information; and writing the recreated data to the previously written track.

4. The data storage device of claim 2, wherein the one or more processing devices, individually or in combination, are further configured such that rewriting the data designated for the previously written track to the previously written track comprises:

determining that the data designated for the previously written track is not stored in a buffer or recoverable from track error correction code information;

recreating the data designated for the previously written track from distributed error correction code information; and writing the recreated data to the previously written track.

5. The data storage device of claim 2, wherein the one or more processing devices, individually or in combination, are further configured such that detecting whether a previously written track yields an anomalous readback signal comprises:

detecting whether a most recently written track yields an anomalous readback signal; and detecting whether one or more tracks written previously to the most recently written track yield an anomalous readback signal.

6. The data storage device of claim 1, wherein the assistive energy emitter comprises a laser emitting component, and wherein the energizing interface comprises an optical interface operatively coupled to the laser emitting component.

7. The data storage device of claim 6, wherein the detector comprises a thermal detector configured to sense thermal energy of the optical interface.

8. The data storage device of claim 6, wherein the detector comprises an optical detector configured to sense optical amplitude in the optical interface.

9. The data storage device of claim 6, wherein the detector comprises a power detector configured to sense power emitted by the laser emitting component or via the optical interface.

10. The data storage device of claim 6, wherein the detector comprises a voltage detector configured to sense voltage drawn by the laser emitting component.

11. The data storage device of claim 6, wherein the optical interface comprises a near-field transmitter.

12. The data storage device of claim 1, wherein the assistive energy emitter comprises a microwave emitting component, and wherein the energizing interface comprises one or more of the microwave emitting component and a microwave interface operatively coupled to the microwave emitting component.

13. The data storage device of claim 12, wherein the detector comprises one or more of: a thermal detector configured to sense thermal energy at the microwave interface; a microwave detector configured to sense microwave amplitude in the microwave interface; a power detector configured to sense power emitted by the microwave emitting component or via the microwave interface; and a voltage detector configured to sense voltage drawn by the microwave emitting component.

14. The data storage device of claim 1, wherein the one or more processing devices, individually or in combination, are further configured such that detecting the energy anomaly in the energizing interface comprises detecting effects on a laser of one or more of: a laser mode hop, an anomalous chemical accumulation on or proximate to the energizing interface, an anomalous chemical corrosion of or proximate to the energizing interface, and a mechanical scratch or mechanical damage on or proximate to the energizing interface.

15. The data storage device of claim 1, wherein the one or more processing devices, individually or in combination, are further configured to:

perform, in response to detecting a plurality of energy anomalies, an escalated write protection process.

16. The data storage device of claim 15, wherein the one or more processing devices, individually or in combination, are further configured such that performing the escalated write protection process comprises writing a current set of data to a cache.

17. A method comprising:

detecting, by one or more processing devices, individually or in combination, via a detector of a selected head of one or more heads of a data storage device comprising one or more disks and an actuator system configured to position the selected head proximate to a corresponding disk surface among the one or more disks, an energy anomaly at an energizing interface of the selected head during a write operation, wherein the selected head comprises a write element, an assistive energy emitter, the energizing interface, and a detector, wherein the energizing interface is coupled to the assistive energy emitter, and wherein the assistive energy emitter is driven separately from driving of the write element;

interrupting the write operation in real time, by the one or more processing devices, individually or in combination, in response to detecting the energy anomaly, and detecting whether a previously written track yields an anomalous readback signal amplitude; and rewriting, by the one or more processing devices, individually or in combination, in response to detecting that the previously written track yields an anomalous readback signal amplitude, data designated for the previously written track to the previously written track.

18. The method of claim 17, wherein rewriting the data designated for the previously written track to the previously written track comprises the one or more processing devices, individually or in combination, performing:

determining whether the data designated for the previously written track remains stored in a buffer;

in response to determining that the data designated for the previously written track remains stored in a buffer, rewriting the data designated for the previously written track from the buffer to the previously written track; and in response to determining that the data designated for the previously written track does not remain stored in a buffer, recreating the data designated for the previously written track from track error correction code information, and writing the recreated data to the previously written track.

19. One or more processing devices, individually or in combination, comprising:

means for detecting, via a detector of a selected head of one or more heads of a data storage device comprising one or more disks and an actuator system configured to position the selected head proximate to a corresponding disk surface among the one or more disks, an energy anomaly at an energizing interface of an energy-assisted write system of the selected head during a write operation, wherein the selected head comprises a write element, an assistive energy emitter, the energizing interface, and a detector, wherein the energizing interface is coupled to the assistive energy emitter, and wherein the assistive energy emitter is driven separately from driving of the write element;

means for interrupting the write operation in real-time, in response to detecting the energy anomaly, and detecting whether a previously written track yields an anomalous readback signal; and means for rewriting, in response to detecting that the previously written track yields an anomalous readback signal, data designated for the previously written track to the previously written track.

20. The one or more processing devices of claim 19, wherein the means for rewriting the data designated for the previously written track to the previously written track comprises:

means for determining whether the data designated for the previously written track remains stored in a buffer;

means for rewriting, in response to determining that the data designated for the previously written track remains stored in a buffer, the data designated for the previously written track from the buffer to the previously written track; and means for recreating, in response to determining that the data designated for the previously written track does not remain stored in a buffer, the data designated for the previously written track from track error correction code information, and writing the recreated data to the previously written track.

* * * * *